(12) United States Patent
Petisme et al.

(10) Patent No.: US 12,504,481 B2
(45) Date of Patent: Dec. 23, 2025

(54) METHOD AND SYSTEM FOR DETERMINING A REMAINING USEFUL LIFETIME OF A BATTERY

(71) Applicant: VOLVO TRUCK CORPORATION, Gothenburg (SE)

(72) Inventors: Martin Petisme, Gothenburg (SE); Alice Hamrin, Gothenburg (SE); Ragunath Balakrishnan, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 446 days.

(21) Appl. No.: 18/060,847

(22) Filed: Dec. 1, 2022

(65) Prior Publication Data

US 2023/0176137 A1    Jun. 8, 2023

(30) Foreign Application Priority Data

Dec. 7, 2021  (EP) .................................... 21212856

(51) Int. Cl.
*G01R 31/392*     (2019.01)
*B60L 58/16*      (2019.01)
*G01R 31/367*     (2019.01)

(52) U.S. Cl.
CPC ............ *G01R 31/392* (2019.01); *B60L 58/16* (2019.02); *G01R 31/367* (2019.01)

(58) Field of Classification Search
CPC ...... G01R 31/392; G01R 31/367; B60L 58/16; G06F 30/20; G06F 2119/04
See application file for complete search history.

(56) References Cited

U.S. PATENT DOCUMENTS

| | | | |
|---|---|---|---|
| 10,928,457 B2* | 2/2021 | Wampler, II | H02J 7/005 |
| 2011/0060539 A1* | 3/2011 | Sciarretta | H01M 10/4285 |
| | | | 702/63 |
| 2015/0239365 A1* | 8/2015 | Hyde | B60L 58/26 |
| | | | 701/2 |
| 2019/0187212 A1 | 6/2019 | Garcia et al. | |
| 2021/0063490 A1 | 3/2021 | Naha et al. | |
| 2022/0067667 A1* | 3/2022 | Mahipal | G06N 3/006 |

OTHER PUBLICATIONS

Extended European Search Report in corresponding European Application No. 21212856.5 dated Jun. 3, 2022 (5 pages).

(Continued)

*Primary Examiner* — Tung S Lau
(74) *Attorney, Agent, or Firm* — Jeffri A. Kaminski; .Venable LLP (57) ABSTRACT

A method for determining a remaining useful lifetime of a propulsion battery of a vehicle. The method includes constructing a voltage feature vector from voltage data of a charging event for the battery, mapping the voltage feature vector to a battery state of health model including an aging mode distribution of different battery aging mechanisms to determine state of health parameters and the present aging mode distribution of the battery; predicting the remaining useful lifetime (RUL) using a physical aging model with the state of health parameters and the present aging mode distribution as inputs to the physical aging model.

14 Claims, 4 Drawing Sheets

(56) References Cited

OTHER PUBLICATIONS

Massimo Scarfogliero et al; "Lithium-ion Batteries for Electric Vehicles: A Review on Aging Models for Vehicle-to-grid Services"; DOI:10.23919/EETA.2018.8493211; International Conference of Electrical and Electronic Technologies for Automotive; Milan, Italy; Jul. 9, 2018; 6 pages.

Yi Li et al; "Data-driven health estimation and lifetime prediction of lithium-ion batteries: A review"; Renewable and Sustainable Energy Reviews; Elsevier, vol. 113(C); Jul. 12, 2019; DOI: 10.1016/j.rser.2019.109254; 18 pages.

Ahmad Alyakhni et al; "A Comprehensive Review on Energy Management Strategies for Electric Vehicles Considering Degradation Using Aging Models"; IEEE Access, IEEE, USA, vol. 9, Oct. 15, 2021, pp. 143922-143940, XP011885021, DOI: 10.1109/ACCESS.2021.3120563; 19 pages.

* cited by examiner

METHOD AND SYSTEM FOR DETERMINING A REMAINING USEFUL LIFETIME OF A BATTERY

TECHNICAL FIELD

The present disclosure relates to a method for determining a remaining useful lifetime of a propulsion battery of a vehicle. The present disclosure also relates to a corresponding system, control unit, and computer program. Although the method and system will be described in relation to a vehicle in the form of a truck, the method and system can also be efficiently incorporated in other vehicles types such as busses, light-weight trucks, passenger cars, construction equipment and marine vessels and industrial equipment, as long as they are at least partly electrically propelled.

BACKGROUND

Batteries are becoming a more common source of power for providing propulsion power to vehicles. Such batteries are rechargeable batteries and consist of several battery cells that may be connected in series and/or in parallel forming a complete battery pack for the vehicle.

In energy management of electric vehicles, the battery state of health is typically monitored. The state of health can be used for predicting a future performance of the battery and therefore it is important to have accurate ways to estimate the state of health. For example, a Li-ion battery cell will, with time and usage, lose capacity and experience resistance increase, limiting the available energy and power.

The future performance of the battery may relate to the remaining useful lifetime of the battery. The remaining useful lifetime may be determined at least partly based on some predetermined future state of health.

Knowledge about the remaining useful lifetime may be used for planning utilization and service of the battery system. Thus, a more accurate determination of the remaining useful lifetime provides for more timely service and better planned usage of the battery which may increase the battery lifetime. Accordingly, it is desirable to improve the predictions of remaining useful lifetime of propulsion batteries for vehicles.

SUMMARY

An object of the invention is to provide an improved method for determining a remaining useful lifetime of a propulsion battery of a vehicle.

According to the first aspect of the invention, there is provided a method for determining a remaining useful lifetime of a propulsion battery of a vehicle. The method comprising constructing a voltage feature vector from voltage data of a charging event for the battery. Mapping the voltage feature vector to a battery state of health model including an aging mode distribution of different battery aging mechanisms, to determine state of health parameters and the present aging mode distribution of the battery. Predicting the remaining useful lifetime using a physical aging model with the state of health parameters and the present aging mode distribution as inputs to the physical aging model.

By the provision of determining not only the state of health parameters, but also the present aging mode distribution of the battery, the proposed method provides for determining a more reliable remaining useful lifetime. The present aging mode distribution provides a predicted distribution of which aging mechanisms that have contributed to the aging of the battery, and to what degree. Since different aging mechanisms affect the remaining useful lifetime to different degrees, including such information enables the physical aging model to predict a more reliable remaining useful lifetime.

In other words, the invention is at least partly based on the realization that the state of health may be deteriorated differently depending on the dominant aging mechanism of the battery. Different ageing mechanisms generally contribute to different ageing rates for the battery. Thus, the inventors realized that knowledge of the physical aging mechanisms of the battery and their contribution to the aging can provide for improved accuracy in predicting the remaining useful lifetime.

The voltage feature vector includes features that can be extracted from the charging event and that may be used in machine learning models such as artificial neural networks including convolutional neural networks, or other fitted empirical models to predict the state of health parameters and the aging mode distribution. Such voltage features may be for example voltage frequency, voltage peak levels, voltage root-mean-square, voltage gradients, voltage standard deviations or a variance, or other features known per se in the art and can range from a whole sequence of logged voltage values or just a few samples.

For example, it could be the voltage sample in steps of fixed amount of percentage of state of charge. Generally, a feature is the input to the artificial neural network.

A charging event is during the time of charging the battery. In other words, the method is preferably applied when the battery is being charged and is thus receiving charging electrical power from a charger connected to a power outlet and to the battery. The voltage features are extracted from the voltage data collected while the battery is being charged.

The remaining useful lifetime may generally be defined as the remaining number of charge cycles before a predetermined state of health threshold is reached. Another analogous way to define the remaining useful lifetime is the remaining number of charge cycles that the battery can be exposed to while still being able to provide a specific output capacity.

Aging mode distribution provides an indication of to what degree different aging mechanism contribute to the aging of the battery.

State of health may be defined as the loss in capacity relative a capacity at the beginning of life of the battery, or the internal resistance increase of the battery relative the internal resistance at the beginning of life of the battery.

State of charge which is mentioned herein is the present level of charge in the battery compared to its full capacity and may be given as a percentage value.

The propulsion battery should be interpreted as providing propulsion energy to the vehicle. Thus, the vehicle may be an electrical, hybrid, or plug-in hybrid vehicle comprising an electrical engine, wherein the battery provides power to the electrical engine for providing propulsion for the electrical, hybrid, or plug-in hybrid vehicle. The battery may be Li-ion battery comprising multiple cells arranged in series and in parallel as is known in the art.

According to an example embodiment, the physical aging model may be adapted to incorporate different aging mechanisms according to the present aging mode distribution, to determine the remaining useful lifetime. This advantageously provides for taking the specific aging mechanisms, and their contribution to aging into account when determining the remaining useful lifetime. Thus, if a first aging mechanism contributes more to aging than a second aging mechanism, and the aging mode distribution reflect the individual contributions of the first and the second aging mechanisms independently, a more accurate determination of the aging can be provided and therefore also a more accurate prediction of the remaining useful lifetime. The physical aging model is adapted to separate the different physical aging mechanisms in its prediction of the remaining useful lifetime.

According to an example embodiment, the state of health parameters may include at least a state of capacity and a state of resistance of the battery. These state of health parameters are well established and advantageously relatively straightforward to measure.

According to an example embodiment, the present aging mode distribution may be indicative of the contribution to aging from at least two different aging mechanisms. Preferably, more than two different aging mechanisms are included in the present aging mode distribution and used by the physical aging model when predicting the remaining useful lifetime.

According to an example embodiment, the physical aging model may be adapted to make a distinction between different aging modes to predict to what degree the aging modes are contributing to aging of the battery. The physical aging model uses the prediction of to what degree the aging modes are contributing to aging of the battery together with the determined state of health parameters to provide an improved prediction of the remaining useful lifetime.

According to an example embodiment, the physical aging model may be an empirical model or be based on an artificial neural network.

According to an example embodiment, the different aging mechanisms may include at least two of active material loss in an anode, and active material loss in a cathode, and solid electrolyte interface growth, and loss of Lithium when the battery is a Li-ion battery.

According to an example embodiment, mapping the voltage feature vector to the battery state of health model may be performed in an artificial neural network. Example artificial neural networks include support vector machines and convolutional neural networks, or other fitted empirical models.

According to an example embodiment, the battery state of health model may be determined from experimental voltage data obtained from cell cycling of multiple batteries under different stress conditions associated with respective cell aging mechanisms, thereby providing experimental voltage data for battery cells related to different aging mechanisms, or from a computational model. Such computational model may be e.g., high fidelity electrochemical models or similar.

According to an example embodiment, the artificial neural network may be trained on the experimental voltage data to predict the state of health and the present aging mode distribution.

According to a second aspect of the invention, there is provided a battery management system for determining a remaining useful lifetime of a propulsion battery of a vehicle. The battery management system comprises: a sensor for sensing voltage data of a charging event when charging the propulsion battery; a memory storage device for storing a battery state of health model including an aging mode distribution of different battery aging mechanisms, and a physical aging model relating state of health parameters and an age mode distribution to a remaining useful lifetime of a battery; and a control unit configured to: construct a voltage feature vector from the voltage data received from the sensor; map the voltage feature vector to the battery state of health model to determine state of health parameters and the present aging mode distribution of the battery; and predict the remaining useful lifetime using the physical aging model with the state of health parameters and the present aging mode distribution as inputs.

There is further provided an energy storage system comprising the battery management system and a propulsion battery.

Effects and features of the second aspect of the invention are largely analogous to those described above in connection with the first aspect.

According to a third aspect of the invention, there is provided a vehicle comprising the system according to the second aspect.

According to a fourth aspect of the invention, there is provided a computer program comprising program code means for performing the steps the first aspect when the program is run on a computer.

According to a fifth aspect of the invention, there is provided a computer readable medium carrying a computer program comprising program code means for performing the steps of the first aspect when the program product is run on a computer.

According to a sixth aspect of the invention, there is provided control unit for determining a remaining useful lifetime of a propulsion battery of a vehicle, the control unit being configured to perform the steps of the method according to the first aspect.

Effects and features of the third, fourth, fifth, and sixth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims.

Like reference character refer to like elements throughout the description.

Figure 1:
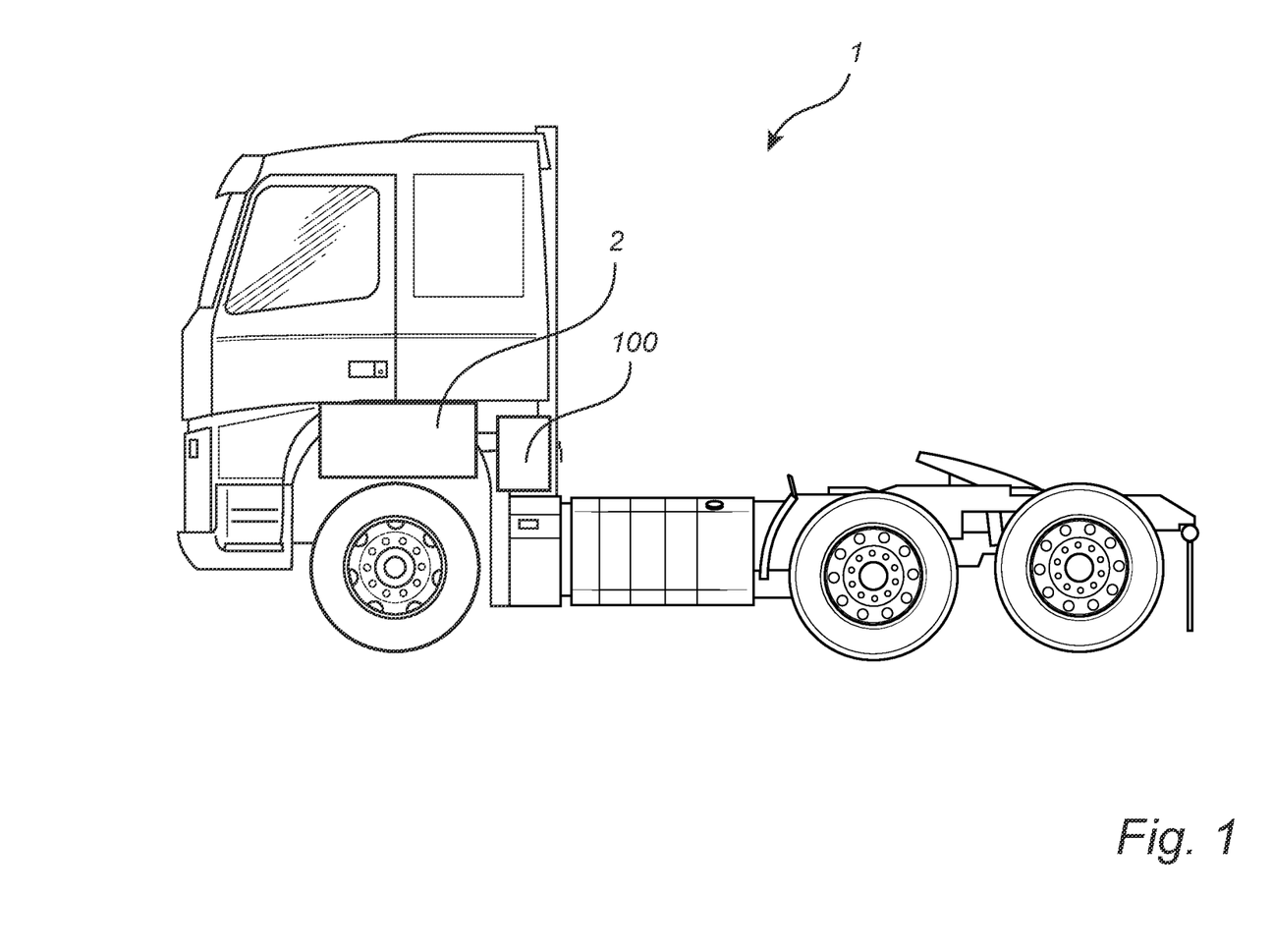
FIG. 1 is a vehicle in the form an electrical truck according to example embodiments of the invention.

FIG. 1 illustrates a vehicle in the form of an electrical truck 1 comprising a propulsion battery 2 generally comprising a plurality of series and parallel connected battery cells. The propulsion battery 2 is arranged to provide power to an electrical engine (not shown) arranged for providing propulsion for the electrical truck 1. The electrical truck 1 further comprises a battery managing system 100 which is configured to monitor battery cell characteristics such as state of charge, battery voltage, and optionally temperature of the battery cells, and to predict the remaining useful lifetime the propulsion battery 2, as will be discussed further herein. The propulsion battery 2 may be a Li-ion battery.

Although the vehicle in FIG. 1 is depicted as a heavy-duty truck, embodiments of the present disclosure may as well be implemented in other types of vehicles, such as in busses, light-weight trucks, passenger cars, construction equipment, industrial applications, and marine applications including e.g., vessels or ships.

Figure 2:
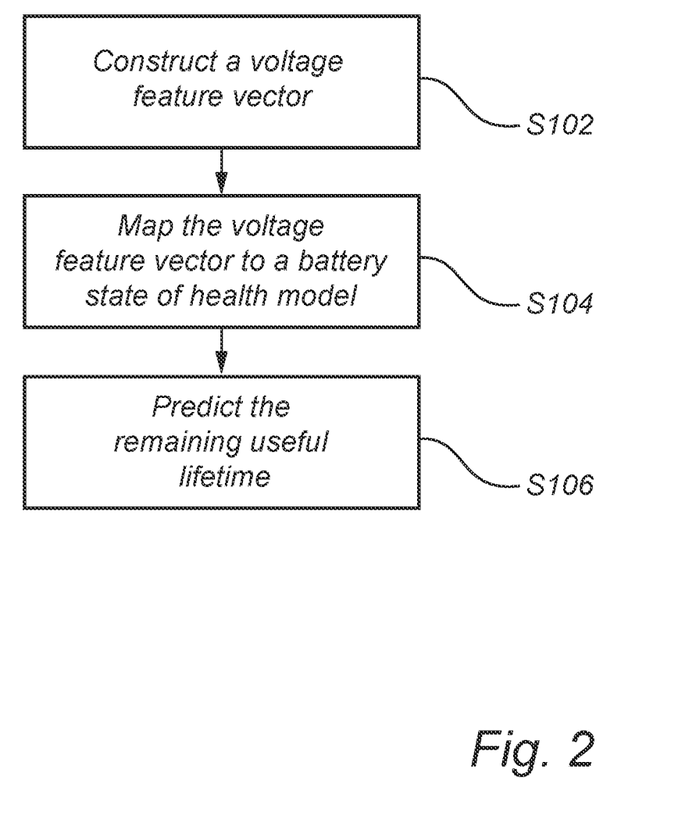
FIG. 2 is a flow-chart of method steps according to example embodiments of the invention.
Figure 3:
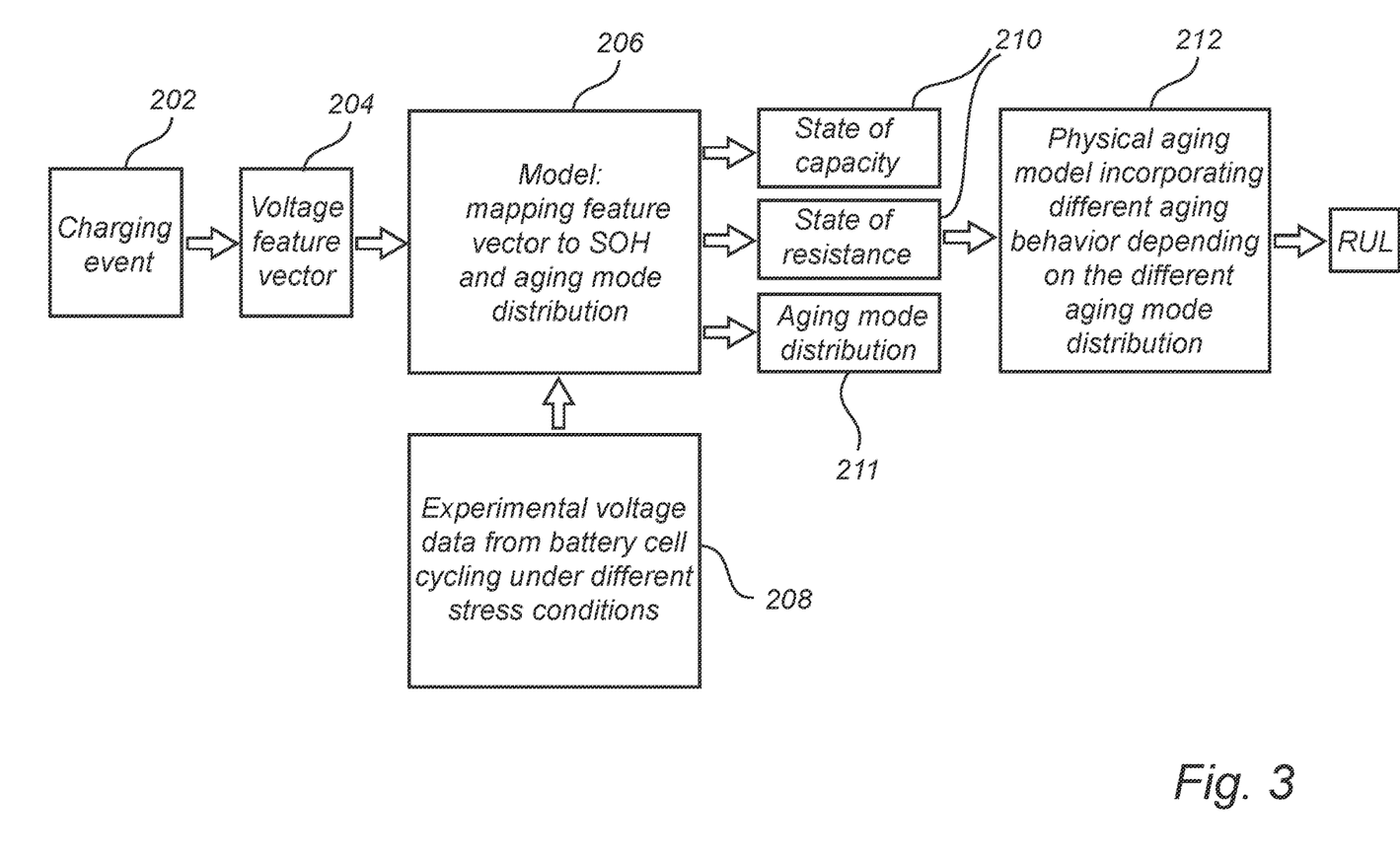
FIG. 3 is a functional flow-chart illustrating embodiments of the invention.

FIG. 2 is a flow-chart of method steps and FIG. 3 is a functional diagram of embodiments of the present invention.

In step S102 a voltage feature vector 204 is constructed from voltage data of a charging event 202 for the battery. As provided in FIG. 3, a charging event 202 is detected, whereby voltage data is sensed by a sensor 102, see FIG. 4, and acquired by a control unit 106, from which voltage features 204 are constructed by the control unit 106. Thus, the control unit 106 processes the voltage data to extract the voltage features such as for example voltage frequency, voltage peak levels, voltage root-mean-square, voltage gradients, voltage standard deviations or variance, or other features known per se in the art. Voltage features can range from a whole sequence of logged voltage values or just a few samples. A charging event 202 may be detected as an initiated charging of the battery 2. Such charging events may be detected in various ways known per se to the skilled person.

Figure 4:
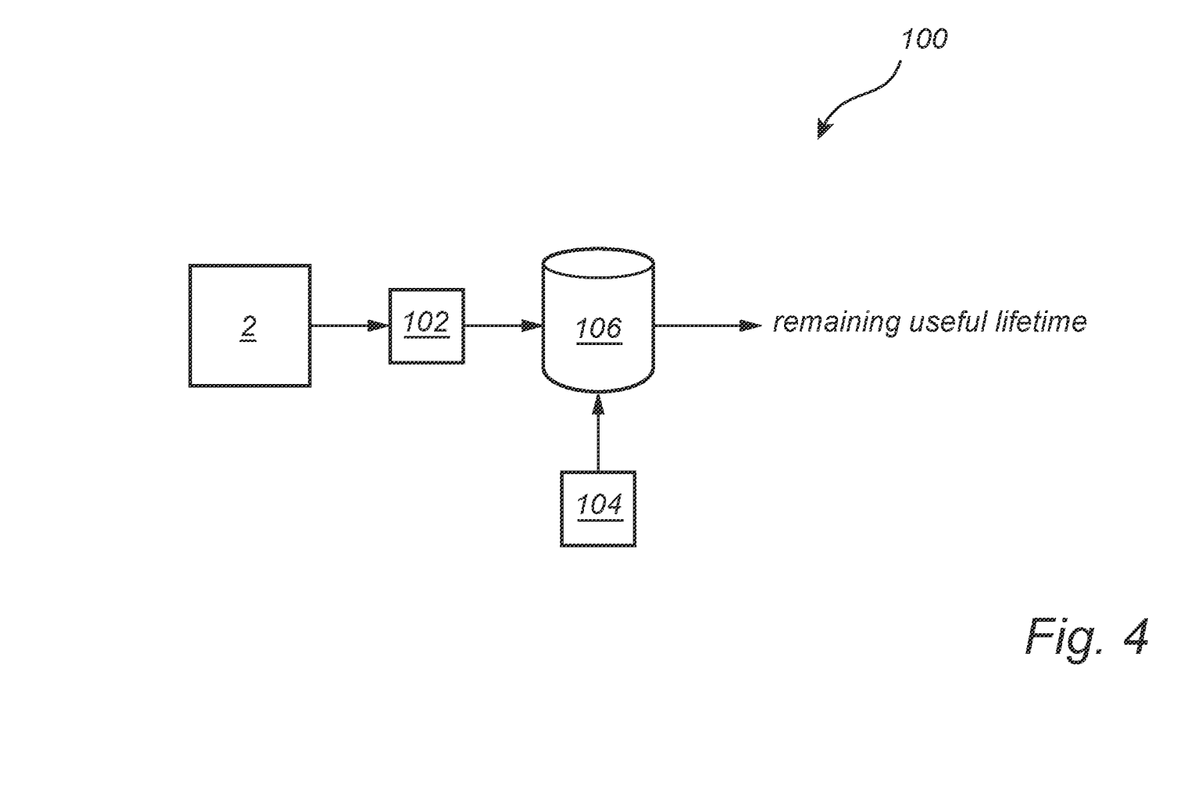
FIG. 4 is a block diagram of a system according to example embodiments of the invention.

In step S104, the voltage feature vector 202 is mapped to a battery state of health model 206 including an aging mode distribution of different battery aging mechanisms to determine state of health parameters 210 and the present aging mode distribution 211 of the battery. The model 206 may be a computational model, or any type of model that can be trained to predict state of health parameters and the present aging mode distribution. Preferably, the model 206 is an artificial neural network such as a convolutional neural network. The model 206, here being an artificial neural network then receives the voltage feature vector 204 and predicts state of health parameters 210 and the present aging mode distribution 211 based on the voltage feature vector and its prior training on training data 208. The mapping may be performed by the control unit 106 using the model 206 which is retrievable from a memory storage device 104.

The state of health model 206 is determined from experimental voltage data obtained from lab experiments including voltage data obtained during battery cell cycling of multiple batteries under different stress conditions associated with respective cell aging mechanisms. This provides experimental voltage data 208 for battery cells related to different aging mechanisms. For example, exposing a battery to a specific type of stress conditions is known to cause aging according to a dominant mechanism. Thus, in this way, the voltage data from one cell cycling process under a specific stress condition can be known to be related to a specific aging mechanism, thus this voltage data can be tagged accordingly so that the model 206 is trained to recognise the specific aging mechanism, and to what degree it caused aging. The artificial neural network 206 is trained on the experimental voltage data 208 to predict the state of health and the present aging mode distribution.

For example, the various stress conditions include high battery temperature, low battery temperature, high charging currents, so called high C-rates being related to how fast a cell is charged, large state of charge window and the position of the state of charge window which all result in cells aged via different physical mechanisms. The position of a state of charge window is the specific SOC range through which charging occur. For example, cycling 30%-90% SoC will cause a different aging mechanism than cycling 10%-70%. Thus, the training data 208 incorporate a wide variety of ageing conditions, e.g., obtained by variations in the above different stress conditions. Further stress conditions that could also be included are mechanical vibrations and mechanical pressure applied to the battery cells.

Incremental capacity analysis-based techniques may then be used to quantify the aging mechanisms using so-called half-cell measurements for separating the anode and cathode sides of the cell as input and correlate the half-cell measurements to the aging behaviour using the physical aging model which is able to separate the different physical ageing phenomena.

The physical aging model 212 may be empirical or based on physical modelling. In contrast to empirical models, physical modelling considers the underlying physical understanding of the phenomena involved, here the aging mechanism. The model 212 incorporates different functional dependence depending on the different aging mechanisms. The quantification of the aging modes is used as the ground truth, i.e., a target value, and lab charging pattern 208 data is used as the feature vector input. The model 206 is in then trained using the data 208 and the quantified aging modes in order to predict the state of health parameters as well as the ageing mechanism split, e.g., the aging mechanism distribution.

The training of the model 206 is performed prior to use of the model 206 and may thereafter be loaded onto the memory storage device 104 so that it can be retrieved by the control unit 106.

The determined state of health parameters 210 includes at least a state of capacity and a state of resistance of the battery 2.

The different aging mechanisms 211 include at least two of active material loss in an anode, and active material loss in a cathode, and solid electrolyte interface growth, and loss of Lithium when the battery 2 is a Li-ion battery.

In step S106, the remaining useful lifetime RUL is predicted using the physical aging model 212 with the state of health parameters 210 and the present aging mode distribution 211 as inputs to the physical aging model 212. This prediction may be performed by the control unit 106 which uses the physical aging model 212 stored on the memory storage device 104.

In other words, the state of health parameters 210 and the present ageing mode distribution 211 in combination with the physical aging model 212 which may mathematically detail the predicted evolution of state of health 210 is used to predict RUL. Since different ageing mechanisms may contribute to accelerating or decelerating ageing rates during a battery lifetime, obtaining information related to different ageing mechanisms and their distribution 211 improves the estimation of the remaining useful lifetime.

The physical aging model 212 is an empirical model or is based on an artificial neural network or a physical model.

Regardless of the type of model, the physical aging model 212 is adapted to incorporate different aging mechanisms according to the present aging mode distribution, to determine the remaining useful lifetime. Thus, the physical aging model 212 is adapted to make a distinction between different aging modes to predict to what degree the aging modes are contributing to aging of the battery.

FIG. 4 is a block diagram of a battery management system 100 according to embodiments of the present invention. The battery management system 100 is configured for determining a remaining useful lifetime of a propulsion battery 2 of a vehicle as describe in relation to preceding drawings. The system 100 comprises a sensor 102 configured to sense voltage data of a charging event when charging the battery 2. The sensor is of suitable type for sensing a voltage.

A memory storage device 104 is included in the system 100 to store a battery state of health model including an aging mode distribution of different battery aging mechanisms. The memory storage device 102 is further configured to store a physical aging model relating state of health parameters and an age mode distribution to a remaining useful lifetime of a battery.

Further, a control unit 106, e.g., an electronic control unit (ECU) is configured to construct a voltage feature vector from the voltage data received from the sensor 102. The control unit 106 is configured to retrieve the battery state of health model from the memory storage device 102 and map the voltage feature vector to the battery state of health model which includes an aging mode distribution of different battery aging mechanisms. In this way, the control unit can determine state of health parameters and the present aging mode distribution of the battery 2.

Further, the control unit 106 is configured to use the physical aging model that can be retrieved from the memory storage device 102 to predict the remaining useful lifetime using the physical aging model with the state of health parameters and the present aging mode distribution as inputs.

The control unit 106 is either hardwired or wirelessly connected to the memory storage device 104 and the sensor 102.

A control unit may include a microprocessor, microcontroller, programmable digital signal processor or another programmable device. Thus, the control unit comprises electronic circuits and connections (not shown) as well as processing circuitry (not shown) such that the control unit can communicate with different parts of the truck such as the brakes, suspension, driveline, in particular an electrical engine, an electric machine, a clutch, and a gearbox in order to at least partly operate the truck. The control unit may comprise modules in either hardware or software, or partially in hardware or software and communicate using known transmission buses such as CAN-bus and/or wireless communication capabilities. The processing circuitry may be a general purpose processor or a specific processor. The control unit comprises a non-transitory memory for storing computer program code and data upon. Thus, the skilled addressee realizes that the control unit may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A method for determining a remaining useful lifetime of a propulsion battery of a vehicle, the method comprising:
constructing, by a vehicle control unit on board the vehicle, a voltage feature vector from voltage data of a charging event for the battery sensed by a sensor, wherein the voltage data is obtained in real-time during vehicle operation;
mapping, by the vehicle control unit, the voltage feature vector to a battery state of health model, stored on a memory storage device, including an aging mode distribution of different battery aging mechanisms to determine state of health parameters and the present aging mode distribution of the battery; and
predicting, by the vehicle control unit, the remaining useful lifetime using a physical aging model, stored on a memory storage device, with the state of health parameters and the present aging mode distribution as inputs to the physical aging mode;
wherein the different aging mechanisms include at least two of active material loss in an anode, and active material loss in a cathode, and solid electrolyte interface growth, and loss of Lithium when the battery is a Li-ion battery.

2. The method according to claim 1, wherein the physical aging model is adapted to incorporate different aging mechanisms according to the present aging mode distribution, to determine the remaining useful lifetime.

3. The method according to claim 1, wherein the state of health parameters includes at least a state of capacity and a state of resistance of the battery.

4. The method according to claim 1, wherein the present aging mode distribution is indicative of the contribution to aging from at least two different ageing mechanisms.

5. The method according to claim 1, wherein the physical aging model is adapted to make a distinction between different aging modes to predict to what degree the aging modes are contributing to aging of the battery.

6. The method according to claim 1, wherein the physical aging model is an empirical model or based on an artificial neural network.

7. The method according to claim 1, wherein mapping the voltage feature vector to the battery state of health model is performed in an artificial neural network.

8. The method according to claim 7, wherein mapping the voltage feature vector to the battery state of health model is performed in an artificial neural network trained on the experimental voltage data to predict the state of health and the present aging mode distribution.

9. The method according to claim 1, wherein the battery state of health model is determined from experimental voltage data obtained from cell cycling of multiple batteries under different stress conditions associated with respective cell aging mechanisms, thereby providing experimental voltage data for battery cells related to different aging mechanisms, or from computational models.

10. A non-transitory computer readable medium carrying a computer program comprising program code for performing the steps of claim 1 when said program code is run on a computer.

11. A control unit for determining a remaining useful lifetime of a propulsion battery of a vehicle, the control unit being configured to perform the steps of the method according to claim 1.

12. The method according to claim 1, further comprising planning service and/or utilization of the battery based on the predicted remaining useful lifetime.

13. A battery management system for determining a remaining useful lifetime of a propulsion battery of a vehicle, comprising:
a sensor for sensing voltage data of a charging event when charging the propulsion battery;
a memory storage device for storing a battery state of health model including an aging mode distribution of different battery aging mechanisms, and a physical aging model relating state of health parameters and an aging mode distribution to a remaining useful lifetime of a battery;
a control unit configured to:
construct a voltage feature vector from the voltage data received from the sensor, wherein the voltage data is obtained in real-time during vehicle operation;
map the voltage feature vector to the battery state of health model to determine state of health parameters and the present aging mode distribution of the battery; and
predict the remaining useful lifetime using the physical aging model with the state of health parameters and the present aging mode distribution as inputs,
wherein the different aging mechanisms include at least two of active material loss in an anode, and active material loss in a cathode, and solid electrolyte interface growth, and loss of Lithium when the battery is a Li-ion battery.

14. A vehicle comprising a battery management system according to claim 13.

* * * * *